March 17, 1942. A. ALLEN ET AL 2,276,448
IMPULSE CONTROLLER
Filed Dec. 1, 1938 2 Sheets-Sheet 1
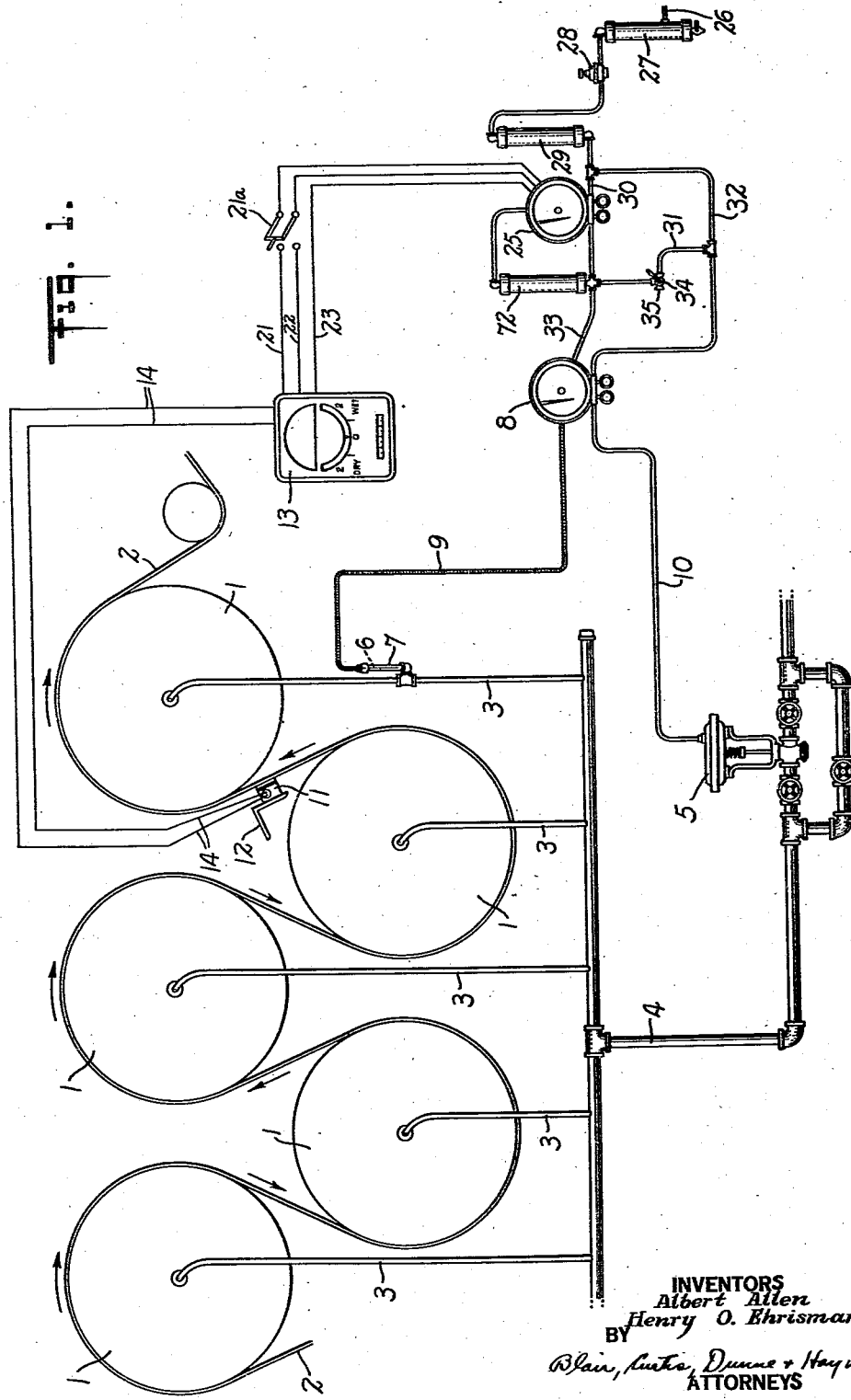
INVENTORS
Albert Allen
Henry O. Ehrisman
BY
Blair, Curtis, Dunne + Hayward
ATTORNEYS March 17, 1942.  A. ALLEN ET AL  2,276,448
IMPULSE CONTROLLER
Filed Dec. 1, 1938  2 Sheets-Sheet 2
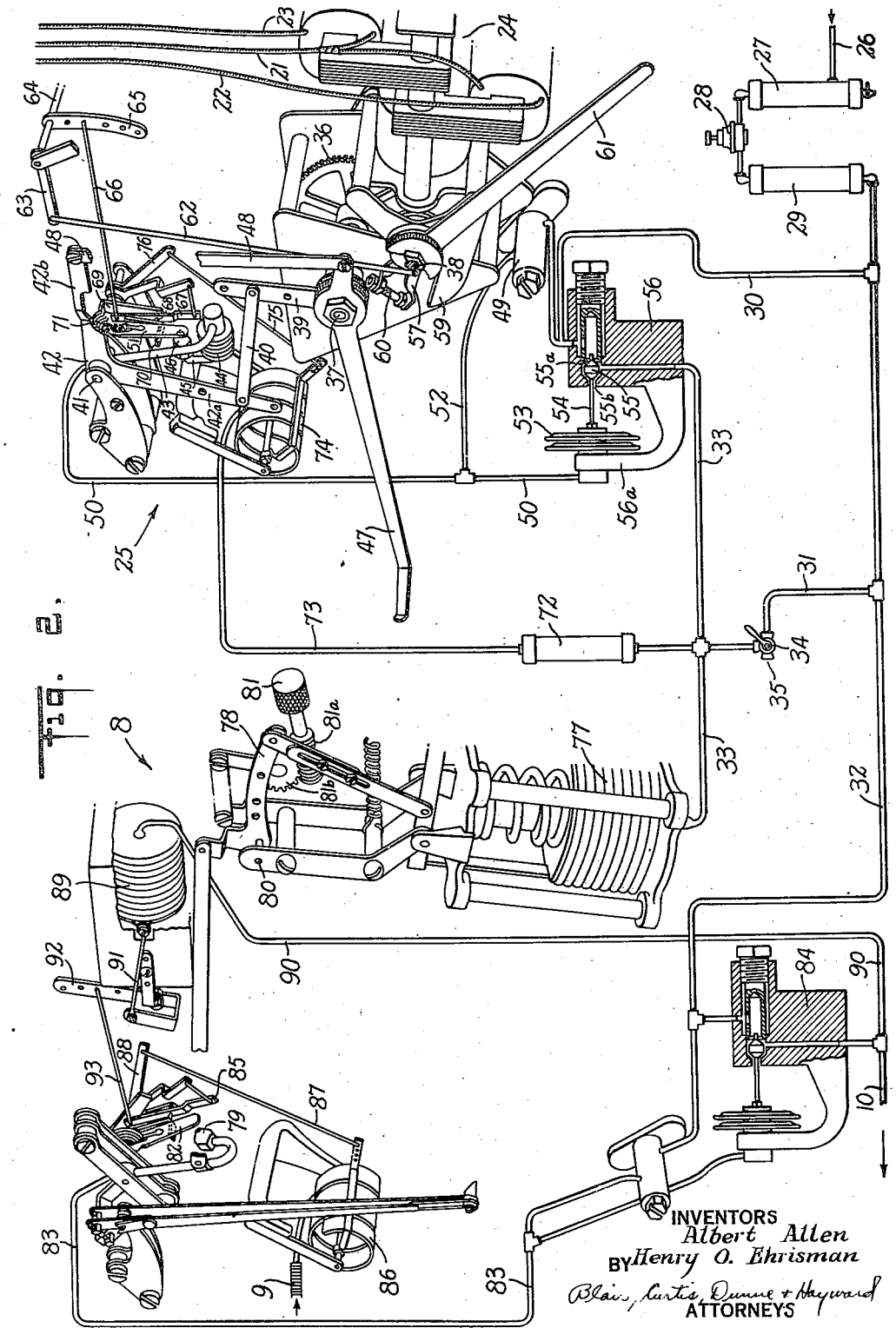
INVENTORS
Albert Allen
BY Henry O. Ehrisman
Blair, Curtis, Dunne + Hayward
ATTORNEYS Patented Mar. 17, 1942

2,276,448

UNITED STATES PATENT OFFICE 2,276,448

IMPULSE CONTROLLER

Albert Allen and Henry O. Ehrisman, Sharon, Mass., assignors to The Foxboro Company, Foxboro, Mass., a corporation of Massachusetts Application December 1, 1938, Serial No. 243,481

15 Claims. (Cl. 34—41)

This invention relates to a method and apparatus for controlling the drying of a running paper web.

In the conventional type of paper drier, the paper is passed alternately over the upper and lower cylinders of two spaced banks of hollow rotatable cylinders which are internally heated by steam. The controlling of the drying of the web is essentially the problem of maintaining the pressure and temperature of the steam fed to the driers at the proper value. Various methods have been proposed for controlling the flow of steam to the cylinders of the drier, among which might be mentioned the maintenance of a constant steam pressure in the cylinders, the maintenance of a constant steam temperature and the use of a value proportional to the moisture content of the web for controlling the flow of steam. None of these methods of control is completely satisfactory in itself. Such temperature and pressure control do not take into account variations in the moisture content of the web coming to the drier and variations in atmospheric humidity conditions. When the flow of steam to the cylinders is being controlled in response to the moisture content of the web alone, changes in the steam quality will not be corrected for until their effect is felt by the moisture responsive element of the controller. The condition thus produced causes cycling, and lack of uniformity in the finished web.

Furthermore, the paper web passing through the drier occasionally breaks. Under these conditions, since the moisture content of the atmosphere is not the same as that of the web, the moisture responsive device tends to change the setting of the steam valve, and when the drier is started up again the cylinders are not at the proper temperature for most effective drying.

The present invention contemplates a novel method and apparatus for utilizing both the temperature of the inlet steam and the moisture content of the paper web as control variables to control the flow of steam admitted to the driers.

A primary controller tends to maintain the steam temperature at a constant value, and the control point of the primary controller is reset in the following manner:

As the moisture content of the web increases beyond the desired value, the control temperature of the primary controller is immediately increased by an arbitrary amount, and thereafter the control temperature is increased at a constant relatively slow rate so long as the moisture content of the web is above the desired value. When the moisture content of the web falls below the desired value, the control temperature of the primary controller is immediately decreased by an arbitrary amount and thereafter the control temperature is decreased at a constant relatively slow rate so long as the moisture content of the web is less than the desired value. In this way changes in steam quality are rapidly corrected for and undesirable temperature change of the cylinders during a paper break is reduced.

Apparatus capable of carrying out the method of the present invention is shown in the accompanying drawings, wherein Figure 1 shows diagrammatically the application of the control instrument to a paper drier; and Figure 2 is a view largely in perspective of the details of the control instrument.

Referring to Figure 1, a conventional type paper drier is shown comprising the hollow rotatable cylinders 1 over which the paper web 2 passes. Steam for heating the cylinders 1 is supplied through branch lines 3 from a steam header 4, the flow of steam through the header 4 being controlled by a pneumatically operated control valve 5 of the usual type. Communicating with the branch line 3 leading to the last cylinder of the drier is a chamber 7 in which is located a temperature-sensitive element 6 which measures the temperature of the inlet steam. Temperature-sensitive element 6 is connected by a length of flexible tubing 9 to a primary controller 8 which tends to maintain the temperature of the inlet steam constant by supplying air through the line 10 to the control valve 5 at a pressure which is a function of the inlet steam temperature in a manner which will be more fully described hereafter.

The moisture content of the paper web is measured just before the web reaches the last cylinder of the drier. Located near the surface of the web 2 there is shown a moisture-sensitive element 11, supported at 12 and connected by a pair of electric conductors 14 to an electronic amplifier unit 13. The construction of the moisture-sensitive element 11 and electronic amplifier unit 13 may be such as that shown in Allen Patents 1,708,073 and 1,708,074 and will not be described in detail herein. They cooperate to cause a current to flow in conductors 21 and 22 when the moisture content of the web is below the desired value, and through conductors 21 and 23 when the moisture content of the web is above the desired value. The conductors 21, 22, and 23 lead to the controller 25 and more particularly to the field windings of a reversible motor 24 (see right-hand side of Figure 2) located therein. Reverting to Figure 1, a manually operated double-pole switch 21a is provided in lines 21 and 22 for purposes which will be more fully described hereafter.

At the lower right-hand corners of Figures 1 and 2 there is shown an air supply line 26 for supplying air to controllers 8 and 25. Air from line 26 passes through a trap 27, thence through a reducing valve 28, and a capacity tank 29 to the branch lines 30, 31, and 32. Branch line 31 communicates with line 33, which connects controller 8 and controller 25, and contains a three-way cock 34 having an outlet to atmosphere 35. The cock 34 may be positioned to cause the pressure in line 33 to be atmospheric pressure, or full-line pressure, or the controlled pressure of controller 25. The function of the cock 34 will be more fully explained hereafter.

Referring now to Figure 2, the reversible motor 24 through a series of reducing gears, somewhat incompletely shown at 36, rotates the shafts 37 and 38 in a clockwise direction when the paper web is too dry and in a counterclockwise direction when the paper web is too wet. The shaft 37 rotates at a relatively slow rate, that is, in the neighborhood of a few degrees per hour, whereas the shaft 38 rotates with an angular velocity approximately 1200 times that of shaft 37. Mounted on shaft 37 and normally moving therewith is a lever 39 which, through the link 40, operates a bellcrank lever 42 pivoted at 41, and comprising the vertical arm 42a and the horizontal arm 42b. Rigidly connected to and moving with bellcrank 42 there is a nozzle assembly unit comprising the tube 43 leading to a bellows 44, a tube 45, and the nozzle 46. Thus motion of the shaft 37 normally causes a corresponding and proportional movement of the nozzle 46. Variations in the ratio of the angular velocity of the shaft 37 to that of the nozzle assembly may be obtained by changing the point at which the link 40 is connected to lever 39 and to the arm 42a of the bellcrank 42. Adjustment of the position of the nozzle assembly for any position of the shaft 37 is accomplished by moving lever 47 which rotates on shaft 37 to move link 48 and the arm 42b of bellcrank 42, thus moving the nozzle assembly. Lever 39 is frictionally connected to shaft 37 to permit relative motion of lever and shaft while this latter adjustment is being made. Mechanism cooperating with a nozzle and for translating nozzle position into a pneumatic instrument controlling pressure will now be described. Referring again to the lower right-hand portion of Figure 2, there is shown a control head 56 which controls the supply of air passing from branch line 30 through line 33, a capacity chamber 72, and line 73 to a helical pressure responsive device 74. Control head 56 comprises a double-headed valve 55 mounted on a valve stem 54 and cooperating with a port 55a which communicates with branch supply line 30 and a port 55b which communicates with atmosphere to regulate the air pressure in line 33. The valve stem 54 is operated by bellows 53 which is supported on an arm 56a of the control head 56. As the bellows 53 expands, valve 55 tends to open line 33 to the atmosphere and to close line 30 to line 33, thus decreasing the pressure in line 33, and as the bellows 53 contracts, valve 55 tends to close line 33 to atmosphere and open line 33 to line 30, thus increasing pressure in line 33. The bellows 53 communicates through a line 50 with the nozzle assembly and nozzle 46. Air is supplied to the line 50 and the nozzle assembly by a branch line 52 which contains a restriction 49.

The bellows 53 is operated from the pressure in back of the nozzle 46 which is varied by means of a flapper 51 as will be described. The helix 74 is connected through link 75 and forked lever 76 to the lower end of a differential lever 67 having a floating pivot 68. The pivot 68 is carried on a yoke 69 which is itself pivoted on shaft 41 and which has a lateral projection 70 against which the flapper 51 bears. The flapper 51 is urged against the projection 70 by a spiral hair spring 71. Helix 74 cooperates with the nozzle and flapper to operate the control head to supply continuously the proper air pressure to the helix to maintain the nozzle and the flapper is operative relationship. This operative relationship is such that when the flapper is against the nozzle or is in its closest position with respect to the nozzle, full back pressure exists in the lines back of the nozzle and the minimum pressure exists in the helix 74, and when the flapper moves away from the nozzle beyond a certain distance, minimum back pressure exists in the lines back of the nozzle and a maximum pressure exists in the helix. The distance through which the flapper may be moved with respect to the nozzle to bring about these minimum and maximum pressures is about 1/1000 of an inch.

The flapper 51 is also positioned by the shaft 38. Frictionally connected to the shaft 38 there is a lever 57 having its end twisted to intercept a screw 60. The travel of the lever 57 is limited by the stop 59 and the head of the screw 60 which is mounted on an extension of the lever 61. As noted above, shaft 38 rotates much more rapidly than shaft 37, and hence when the motor 24 reverses the direction of rotation of shaft 38, the lever 57 moves in a comparatively short period of time from its position in contact with the head of screw 60 to a position in contact with the stop 59, or vice versa. The clearance between screw 60 and stop 59 may be varied by manual rotation of lever 61. Lever 57, acting through link 62, lever 63, shaft 64, arcuate member 65 and link 66 moves the upper end of differential lever 67, thus causing movement of flapper 51. Clockwise motion of the lever 57 causes the flapper 51 to move towards the nozzle 46, and counterclockwise motion of the lever 57 causes the flapper 51 to move away from the nozzle 46. This change in the position of the flapper 51 resulting from movement of the lever 57 causes a corresponding change in pressure in the helix 74 and in the line 33.

The action of the helical pressure-responsive element 74 is such that it always opposes the action of the lever 57. For example, clockwise rotation of lever 57 produces clockwise rotation of pivot 68 and the flapper tends to move closer to the nozzle. The resulting increase in pressure on line 50 produces a decrease in pressure in line 73 and pressure-responsive element 74 causes forked lever 76 to move in counterclockwise direction, thus moving the flapper away from the nozzle. Counterclockwise rotation of lever 57 produces an opposite result.

The function of the apparatus thus far described is to create in the line 33 a fluid pressure which is related to the moisture content of the web. This pressure is in turn used to vary the control point setting of a primary temperature controller shown at the left of Figure 2, which comprises, in general, a nozzle and flapper similar to nozzle 46 and flapper 51 already described, which coact with the temperature-sensitive element 6 and a bellows 89 to produce a fluid pressure in the line 10, which depends both on the temperature of steam going to the driers and on the moisture content of the paper web. This fluid pressure operates the steam control valve 5 to vary the flow of steam to the cylinders in accordance with variations in both temperature and moisture content.

The control pressure of line 33 is transmitted to an expansible bellows 77 which operates bellcrank 78 to position nozzle 79. Bellcrank 78 is pivoted at 80 on a floating pivot and the position of pivot point 80 may be changed by adjustment of the thumb screw 81 acting through a worm 81a and modified spur gear 81b. Thumb screw 81 provides means for manually adjusting the relation between the primary and secondary controllers by changing the relation between the position of nozzle 79 and the pressures existing in bellows 77. The function and importance of this adjustment are explained below. The nozzle 79 coacts with a flapper 82 which is similar to the flapper 41 to produce variations in pressure in the line 83 which are transmitted to the control head 84. Flapper 82 is actuated by a differential lever 85 similar to the lever 67, one end of the lever being positioned in response to the temperature of the steam entering the drying cylinders, and the other end of the lever being positioned in response to the output pressure of the control head 84, which is the same as the pressure on the diaphragm of the pneumatically operated control valve 5. The lower end of differential lever 85 is positioned by a helical temperature-responsive element 86 acting through link 87 and forked lever 88. As noted above, helical temperature-responsive element 86 is responsive to the temperature-sensitive element 6 shown in Figure 1, and is connected thereto by a length of flexible tubing 9. The upper end of differential lever 85 is positioned by a bellows 89 which communicates through a tube 90 with the output pressure of control head 84 and which acts through link 91, lever 92, and link 93 to move the differential lever. The relation between the movement of bellows 89 and the movement of the upper end of differential lever 85 may be varied by changing the point at which link 93 connects to lever 92.

The primary controller 8 is essentially a temperature controller, the control point of which depends upon the position of the nozzle 79. The position of nozzle 79 and hence the control point of the controller 8 is reset by the secondary controller 25 in response to variations in the moisture conditions of the paper web. Variations in steam quality are corrected for by the temperature controller. For example, an improvement in steam quality and the resultant increase in the temperature of the steam would cause the flapper 82 to move toward the nozzle 79, thus increasing the pressure in line 83, decreasing the pressure in the line 10, and tending to close the valve 5 to reduce the flow of steam to the cylinders. Upon a decrease of steam quality the operation would be reversed. Thus this controller 8 operates to maintain the temperature of the steam drier at the value called for by the instrument 25.

The instrument 25 operates to set the control temperature of controller 8 up a certain amount immediately after the moisture content of the web passes above a definite value and to set the temperature down a certain amount when the moisture content of the web passes below the said definite value, the amount of this "kick" being adjustable as above described. To this extent, controller 25 operates as an open-and-shut controller and takes care of transient changes in moisture condition.

In the event that conditions in the drying operation change to cause a persistent change in moisture condition to exist, which cannot be fully compensated for by the primary reaction of the controller 25, the slowly operating shaft 37 gradually adjusts the position of the nozzle 46 to change the position of the temperature range through which the primary reaction operates.

In order to describe the operation of controllers 25 and 8 more in detail it will be first assumed that the moisture content of the web 2 is slightly greater than the desired value and decreasing. Under such conditions any particular point on the web such as, for example, at the detector unit 12, will continuously become drier and so long as the moisture content is greater than the desired value, detector 12 will cause amplifier unit 13 to supply energy through conductors 21 and 23 to reversible motor 24. When the moisture content of the web at the detector 12 passes the desired value, the amplifier unit 13 begins transmitting energy to the reversible motor 24 through the conductors 21 and 22 to reverse the direction of rotation of motor 24 and cause the motor to rotate shafts 37 and 38 in a clockwise direction. Lever 57 is moved by shaft 38 in a comparatively short period of time from a position in contact with stop 59 to a position in contact with the head of screw 60; and, through link 62, lever 64, arcuate member 65 and link 66, moves the upper end of differential lever 67 and hence tends to move the flapper 51 toward nozzle 46. As described above, the element 74 cooperates to maintain the flapper in operative position with respect to the nozzle, and the net effect of movement of the upper end of differential lever 67 is to cause a relatively small and relatively rapid decrease of predetermined magnitude in the pressure supplied through line 33 to bellows 77. Contraction of bellows 77 with this decreasing pressure rotates bell crank lever 78 in a clockwise direction around pivot 80 and moves nozzle 79 closer to flapper 82. Bellows 89, like responsive element 74, maintains flapper 82 in operative relationship with nozzle 79 and the effect of this counterclockwise movement of nozzle 79 is to increase pressure in line 83, thus decreasing pressure in line 10 and so tending to close control valve 5 and supply less steam to the driers.

The control point of the controller 8, that is, the temperature which the controller 8 tends to maintain for any given value of pressure in bellows 77, depends upon the position of the nozzle 79, and hence the movement of nozzle 79, under the influence of pressure changes in bellows 77, may be described as changing or resetting the control point of the controller 8.

Simultaneously with this relatively rapid primary reaction, there is a relatively slow secondary reaction produced by the clockwise rotation of shaft 37 referred to above. Operating through lever 39, link 40 and bell crank 42, shaft 37 slowly moves nozzle 46 in a counterclockwise direction as shown, to slowly increase pressure in line 50, decrease pressure in line 33, and slowly move nozzle 79 in a counterclockwise direction, thus tending to slowly close valve 5 still further and reduce the heat supplied to the paper web. Thus the secondary reaction slowly reduces the control point setting of controller 8, or saying the same thing in other words, slowly reduces the steam temperature which controller 8 tends to maintain. When the moisture content of the web 2 at detector 12 becomes greater than the desired value, amplifier unit 13 again supplies energy through conductors 21 and 23 to reverse the direction of rotation of motor 24 and the operations as described above occur in reverse sense.

As noted above, branch line 31, which communicates with line 33, is provided with a three-way cock 34. The function of this cock is to take care of unusual operating conditions. Under normal conditions the cock is set in such a manner that branch line 31 and exhaust port 35 are cut off from line 33. During a prolonged paper break, however, it is desirable to set the cock in such a manner as to vent line 33 and bellows 77. Under these conditions nozzle 79 is moved to its extreme counterclockwise position and the controller operates to maintain a constant steam temperature at the bottom of the throttling range of the instrument. It is also desirable that the switch 21a be thrown to interrupt the flow of current in conductors 21 and 22 and prevent the controller 25 from drifting up to one end of its range. In this way steam economy may be obtained without undue cooling of the cylinders, and when the instrument is again placed in operation it picks up at approximately the point where it left off.

When the load on the drying cylinders is suddenly increased, as, for example, when a heavier grade of paper is started over the cylinders, it is usually desirable to set the cock 34 in such a manner as to admit supply air through pipe 31 to the bellows 77. The nozzle 79 is then moved away from the flapper to its extreme clockwise position, corresponding to the highest temperature of the throttling range of the instrument. In this way a large temporary increase in the quantity of steam supplied to the drier can be obtained.

It is desirable that the controller 25 operate near the middle of its range, that is, that the average of pressures existing in the bellows 77 be in the neighborhood of one-half the available pressure. The manually adjustable knob 81 is provided for changing the relation between controller 8 and controller 25 when it appears that the average of pressures in bellows 77 is near the maximum or minimum pressure available. Rotation of the knob 81 in such a direction as to move the nozzle 79 away from the flapper causes the controller to maintain a higher steam temperature for any given pressure in the bellows 77, and vice versa. Thus, by adjustment of knob 81 it is possible to keep the controller 25 operating within its effective range.

The present invention provides an efficient means for controlling the drying of a paper web in response to both the temperature of the inlet steam and the moisture condition of the web. Both temperature and moisture content are directly measured, and the measurements are combined in such a manner as to reduce the undesirable effects of process lags.

Since many embodiments might be made of the above invention, and since many changes might be made in the embodiment here disclosed, it is to be understood that all matter hereinbefore set forth is to be interpreted as illustrative only and not in a limiting sense.

We claim:

1. The method of maintaining at a desired value the moisture condition of a running web of paper being dried by passage over heated drying rolls, comprising the steps of regulating the heat supply to said drying rolls to effectively maintain the temperature of said drying rolls at a control point, adjusting said control point in response to variations of said moisture condition to slowly raise said control point when said moisture condition is greater than the said desired value and slowly lower said control point when said moisture condition is less than the desired value, and superimposing on said adjustment responsive to changes in said moisture condition an impulse which immediately sets said control point upward a predetermined amount when said moisture condition goes above the desired value, and immediately sets said control point downward a predetermined amount when said moisture condition goes below the desired value.

2. The method of maintaining at a desired value the moisture condition of a running web of paper being dried by passage over steam heated drying rolls, comprising the steps of regulating the steam supply to said drying rolls to maintain the temperature of the steam going to said drying rolls at a control point, adjusting said control point in response to variations of said moisture condition to slowly raise said control point when said moisture condition is greater than said desired value and slowly lower said control point when said moisture condition is less than the desired value, and superimposing on said adjustment responsive to changes in said moisture condition an impulse which immediately sets said control point upward a predetermined amount when said moisture condition goes above the desired value and immediately sets said control point downward a predetermined amount when said moisture condition goes below the desired value.

3. Apparatus for controlling the drying of a running paper web being dried by passage over heated drying rolls, comprising in combination, means for supplying heat to said drying rolls, control means effectively responsive to the temperature of said drying rolls for regulating said heat supply means to control the supply of heat to said drying rolls, control mechanism for adjusting said control means to maintain various temperature conditions of said rolls, said control mechanism including means responsive to a continuous moisture condition of said paper web, a source of fluid pressure, a fluid pressure system, means controlled by said moisture-responsive means for maintaining a slowly changing fluid pressure in said system, the direction of change being dependent upon whether the moisture condition is above or below a desired value, and means controlled by said moisture-responsive means for superimposing on said fluid pressure maintaining means an impulse causing said maintaining means to step said fluid pressure up or down a predetermined amount as said moisture condition passes respectively above or below said desired value, and fluid pressure operated means operated by said fluid pressure for adjusting said control means as described.

4. Apparatus for controlling the drying of a running paper web being dried by passage over steam heated drying rolls, comprising in combination, means for supplying steam to said drying rolls, control means responsive to the temperature of the steam entering said drying rolls for regulating said steam supply means to control the supply of said steam to said drying rolls, control mechanism for adjusting said control means to maintain various temperature conditions of said steam, said control mechanism including means responsive to a continuous moisture condition of said paper web, a source of fluid pressure, a fluid pressure system, means controlled by said moisture-responsive means for maintaining a slowly changing fluid pressure in said system, the direction of change being dependent upon whether the moisture condition is above or below a desired value, and means controlled by said moisture-responsive means for superimposing on said fluid pressure maintaining means an impulse causing said maintaining means to step said fluid pressure up or down a predetermined amount as said moisture condition passes respectively above or below said desired value, and fluid pressure operated means operated by said fluid pressure for adjusting said control means as described.

5. Apparatus for controlling the drying of a running paper web being dried by passage over heated drying rolls, comprising in combination, means for supplying heat to said drying rolls, a temperature controller effectively responsive to the temperature of said drying rolls for regulating said heat supply means to control the supply of heat to said rolls, control mechanism responsive to the moisture condition of the paper web for setting the control point of said temperature controller, said control mechanism comprising means responsive to the moisture condition of the paper, means controlled by said moisture responsive means for adjusting the control point of said temperature controller to raise said temperature at a relatively slow rate when the moisture condition is above a desired value and to lower said temperature at a relatively slow rate when the said moisture condition is below the desired value, and means controlled by said moisture responsive means for changing said temperature a predetermined amount at a relatively rapid rate as the moisture condition passes the desired value.

6. Apparatus for controlling the drying of a running paper web being dried by passage over steam heated drying rolls comprising in combination, means for supplying steam to said drying rolls, a temperature controller responsive to the temperature of the steam entering said drying rolls for regulating said steam supply means to control the supply of steam to said rolls, control mechanism responsive to the moisture condition of the paper for setting the control point of the said temperature controller, said control mechanism comprising means responsive to the moisture content of the paper, means controlled by said moisture responsive means for adjusting the control point of said temperature controller to raise said temperature at a relatively slow rate when the moisture condition is above a desired value and to lower said temperature at a relatively slow rate when the moisture condition is below the desired value, and means controlled by said moisture responsive means for changing said temperature a predetermined amount at a relatively rapid rate as the moisture condition passes the said desired value.

7. Apparatus for controlling the heat supply to drying cylinders for drying a running web passing thereover comprising, in combination, means for supplying heat to said cylinders, control means effectively responsive to the temperature of said cylinders for regulating said heat supply means to control the temperature of said cylinders, means effectively responsive to the moisture content of the web for regulating said temperature responsive means and indirectly said heat supply to said drying cylinders, and auxiliary means for interrupting the control effect of said moisture responsive means and for setting said control means to maintain a predetermined temperature of the drying cylinders during a temporary interruption of the drying operation.

8. Apparatus for controlling the heat supply to drying cylinders for drying a running web passing thereover comprising, in combination, means for supplying heat to said drying cylinders, control means effectively responsive to the temperature of said cylinders for regulating said heat supply means to control the temperature of said cylinders, means effectively responsive to the moisture content of the web for regulating said temperature responsive means and indirectly said heat supply to said drying cylinders, and manually operated auxiliary means for setting said control means to maintain a predetermined temperature of said drying cylinders during a temporary interruption of the drying operation and for increasing the temperature maintained by said control means to a predetermined value when a sudden increase in heat demand occurs.

9. Apparatus for controlling the drying of a running paper web being dried by passage over steam heated drying rolls wherein the supply of steam to heat said rolls is controlled by means responsive to the measured value of the moisture condition of said paper web to maintain said moisture condition at a desired value, comprising in combination, control means responsive to the temperature of the steam entering said drying rolls for regulating the supply of said steam thereto, control mechanism for adjusting said control means to maintain various temperature conditions of said steam, said control mechanism including a source of fluid pressure, a fluid pressure system, means controlled by said moisture-responsive means for maintaining a slowly changing fluid pressure in said system, the direction of change being dependent upon whether the moisture condition is above or below the desired value, and means controlled by said moisture-responsive means for superimposing on said fluid pressure maintaining means an impulse causing said means to step said fluid pressure up or down a predetermined amount as said moisture condition passes respectively above or below said desired value, and fluid pressure operated means operated by said fluid pressure for adjusting said control means as described.

10. Apparatus for maintaining a condition at a desired value comprising, in combination, a motor, means for energizing said motor, first control means responsive to the condition being controlled for causing said motor to operate in one sense when the value of said condition is greater than the desired value and in opposite sense when the value of said condition is less than the desired value, second control means for controlling a second condition and including an element responsive to said second condition, means for causing said second condition to influence the condition being controlled and means for interconnecting said motor and said second control means whereby said first control means acting through said motor supervises said second control means, said interconnecting means including a source of fluid pressure, a fluid pressure system, a flapper and nozzle for controlling the value of said pressure in said fluid pressure system, means responsive to said fluid pressure in said system for adjusting the second control means to change the value of the second condition controlled thereby, and means actuated by said motor for adjusting said flapper and nozzle to produce a sudden change in said fluid pressure when said first condition passes said desired value and for imposing a further but slower change in the same direction until said first condition again passes said desired value.

11. In apparatus for maintaining a condition at a desired value, in combination, a motor, means for energizing said motor, first control means responsive to the value of said condition for causing said motor to operate in one sense when the value of said condition is greater than said desired value and in opposite sense when the value of said condition is less than said desired value, second control means responsive to the value of a second condition for maintaining said second condition at a control point, means for causing said second condition to influence said first condition, means for interconnecting said motor and said second control means and operated by said motor to make said second control means responsive to said motor to produce a sudden change in said control point when said first condition passes the desired value, and thereafter to produce a relatively slow change in said control point at a predetermined constant rate, said slow change continuing until the value of said first condition again passes said desired value, and means for adjusting the relationship between said motor and said second control means.

12. In apparatus for maintaining a condition at a desired value, in combination, a reversible motor, means for energizing said motor, first control means including means responsive to the condition being controlled for reversing the direction of rotation of said reversible motor when the value of said condition becomes greater or less than said desired value, second control means including an element responsive to a second condition for maintaining said second condition at a control point, means for causing said second condition to influence the condition being controlled, and means for interconnecting said motor and said second control means whereby said first control means acting through said motor supervises said second control means, said interconnecting means including a source of fluid pressure for setting the control point of said second control means, a flapper and nozzle which when in operative relationship coact to regulate the supply of fluid pressure to set said control point, means operated by said reversible motor for slowly changing the position of said nozzle, means also operated by said reversible motor for rapidly changing the position of said flapper a predetermined amount upon reversal of said motor, and means responsive to the value of said fluid pressure for maintaining said flapper and nozzle in operative relationship as they are acted upon by said motor operated means whereby the supply of fluid pressure to set the control point of said second control means is caused to change slowly by the movement of said nozzle and is caused to change rapidly a predetermined amount by the movement of said flapper by said motor.

13. In apparatus for maintaining a condition at a desired value, in combination, a reversible motor, means for energizing said motor, first control means including means responsive to the condition being controlled for reversing the direction of rotation of said reversible motor when the value of said condition becomes greater or less than said desired value, second control means including an element responsive to a second condition for maintaining said second condition at a control point, means for causing said second condition to influence the condition being controlled, and means for interconnecting said motor and said second control means whereby said first control means acting through said motor supervises said second control means, said interconnecting means including a source of fluid pressure for setting the control point of said second control means, a flapper and nozzle which when in operative relationship coact to regulate the supply of fluid pressure to set said control point, adjustable means operated by said reversible motor for slowly changing the position of said nozzle, adjustable means also operated by said reversible motor for rapidly changing the position of said flapper a predetermined amount upon reversal of said motor, and means responsive to the value of said fluid pressure for maintaining said flapper and nozzle in operative relationship as they are acted upon by said motor operated means whereby the supply of fluid pressure to set the control point of said second control means is caused to change slowly by the movement of said nozzle and is caused to change rapidly a predetermined amount by the movement of said flapper by said motor.

14. In apparatus for maintaining a condition at a desired value, in combination, a reversible motor, means for energizing said motor, first control means including means responsive to the condition being controlled for changing the direction of rotation of said reversible motor in accordance with whether said condition is greater or less than said desired value, second control means including an element responsive to a second condition for maintaining said second condition at a control point, means for causing said second condition to influence the condition being controlled, and means for interconnecting said reversible motor and said second control means whereby said first control means acting through said motor supervises said second control means, said interconnecting means including a source of fluid pressure, a fluid pressure system, a flapper and nozzle which coact to regulate the pressure in said system, adjustable means for changing the position of said nozzle including a shaft rotated by said motor at a relatively slow rate and a linkage connecting said shaft and said nozzle, adjustable means for changing the position of said flapper including a shaft rotated by said motor at a relatively high rate and a linkage connecting said flapper to a lever, said lever being frictionally connected to said shaft and operating through a predetermined and adjustable arc, means responsive to the value of said fluid pressure for maintaining said flapper and nozzle in operative relationship, and means responsive to said fluid pressure for adjusting the control point of said second control means.

15. In apparatus for maintaining a condition at a desired value, in combination, a motor, means for energizing said motor, first control means responsive to the value of said condition for causing said motor to operate in one sense when the value of said condition is greater than said desired value and in opposite sense when the value of said condition is less than said desired value, second control means responsive to the value of a second condition for maintaining said second condition at a control point, means for causing said second condition to influence said first condition, and means for interconnecting said motor and said second control means and operated by said motor to make said second control means responsive to said motor to produce a sudden change in said control point when said first condition passes the desired value, and thereafter to produce a relatively slow change in said control point at a predetermined constant rate, said slow change continuing until the value of said first condition again passes said desired value.

ALBERT ALLEN.
HENRY O. EHRISMAN.